(12) United States Patent
Tannenbaum

(10) Patent No.: US 7,158,949 B1
(45) Date of Patent: Jan. 2, 2007

(54) METHOD FOR PROVIDING PROPERTY RIGHTS BASED GUARANTEES

(75) Inventor: David H. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 0 days.

(21) Appl. No.: 11/015,479

(22) Filed: Dec. 17, 2004

(51) Int. Cl.
*G06Q 40/00* (2006.01)
(52) U.S. Cl. .......................................... 705/35; 705/38
(58) Field of Classification Search ................. 705/35, 705/38
See application file for complete search history.

(56) References Cited

U.S. PATENT DOCUMENTS

| | | | |
|---|---|---|---|
| 6,330,547 B1 * | 12/2001 | Martin ........................ | 705/38 |
| 2002/0138384 A1 * | 9/2002 | Malackowski et al. ....... | 705/36 |
| 2004/0059658 A1 * | 3/2004 | Sosville ....................... | 705/35 |
| 2004/0186805 A1 * | 9/2004 | Gologorsky et al. .......... | 705/37 |

FOREIGN PATENT DOCUMENTS

WO WO 03/098508 A1 * 11/2003

OTHER PUBLICATIONS

Molecular Diagnostics Announces Retirement of Debt Instrument and Definitive Agreement; Business Wire. New York: Dec. 23, 2002.*
Green, Phillip L. Sound Content Management Starts at the Local Level. Information Today. Medford: Jun. 2003. (4 pages).*

* cited by examiner

*Primary Examiner*—Richard E. Chilcot, Jr.
*Assistant Examiner*—Jennifer L Liversedge
(74) *Attorney, Agent, or Firm*—Fulbright & Jaworski LLP

(57) ABSTRACT

There is disclosed a method of supporting a financial transaction involving an owner of IP rights. A potential guarantor evaluates the IP rights to determine a guarantee value thereof. The guarantor then provides a pledge to pay to a named party the determined guarantee value in exchange for the guarantor receiving ownership of the IP rights in the event of a default of the financial transaction. In one embodiment, a third party provides payment even prior to any such default occurring.

16 Claims, 1 Drawing Sheet

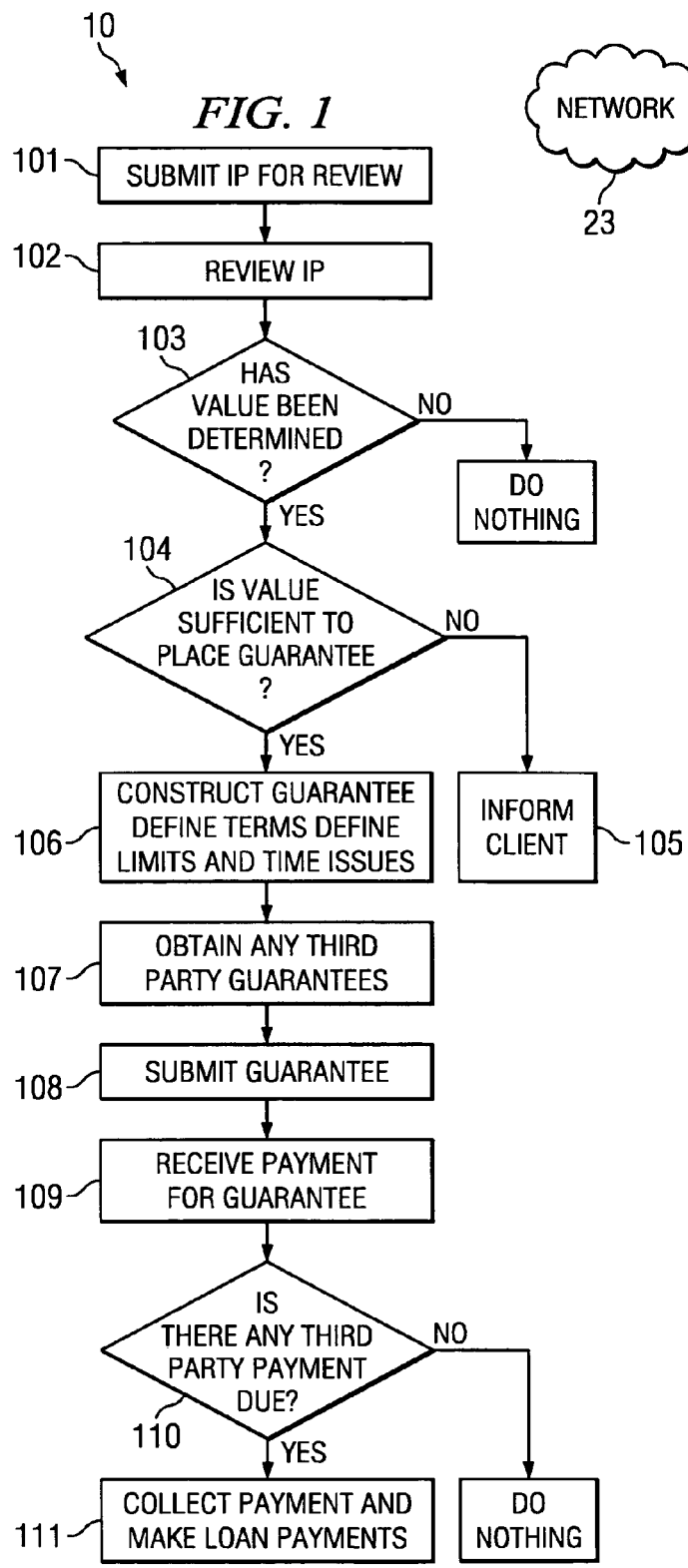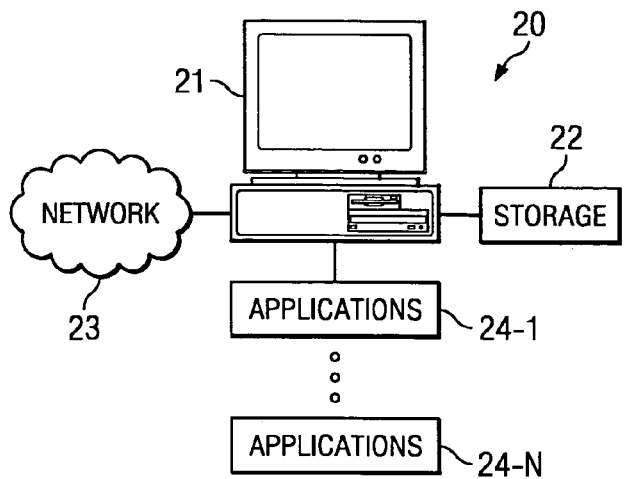

METHOD FOR PROVIDING PROPERTY RIGHTS BASED GUARANTEES

CROSS-REFERENCE TO RELATED APPLICATIONS

This application is related to concurrently filed, copending patent application No. 11/015,601 entitled System and Method for Obtaining Property Rights, both applications having the same inventorship, said application hereby incorporated by reference herein.

TECHNICAL FIELD

The concepts discussed herein relate to obtaining property rights based guarantees and more particularly to systems and methods for facilitating financial transactions by allowing a party to the transaction to secure the equity in property rights.

BACKGROUND OF THE INVENTION

Property rights, particularly intellectual property (IP) rights, have become an important factor in commerce. While the IP field is wide-ranging, for ease of discussion it might be easier to focus on patents, copyrights, trademarks and tradesecrets. Many companies spend large sums of money on development and research and as a result thereof over a course of time create very valuable intellectual property. These valuable rights are often manifest in the issuance by the government of Letters Patent. Such patents have inherent rights associated with them, these rights being the right to prevent others from making, using selling, or importing any product that infringes any claim of the patent. Often, a fair amount of a company's true value is represented by its patent portfolio Since the value of a company's IP rights is unique to that company, this does not have much liquidity. Accordingly, financial institutions typically can not lend money based on such IP rights. Thus, while a company may have a high valuation based on its know how and other IP rights, that valuation is mostly unavailable as collateral for a financial transaction such as a loan. This then means that great wealth is today being held in a most intangible manner and can often only be obtained (if at all) by bringing expensive and time consuming patent litigation. Accordingly, a large portion of the value of a company is locked away and unavailable to support future growth.

BRIEF SUMMARY OF THE INVENTION

In one embodiment, there is disclosed a method of supporting a financial transaction involving an owner of IP rights. A potential guarantor evaluates the IP rights to determine a guarantee value thereof. The guarantor then provides a pledge to pay to a named party the determined guarantee value in exchange for the guarantor receiving ownership of the IP rights in the event of a default of the financial transaction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows one embodiment of a process for establishing an IP rights-based financial guarantee; and FIG. 2 shows one embodiment of system for controlling the process of FIG. 1.

DETAILED DESCRIPTION OF THE INVENTION

FIG. 1 shows one embodiment 10 of a process for establishing an IP rights-based financial guarantee so as to allow a person, or a company, who has substantial value in IP rights the ability to borrow against the IP rights from a conventional lender.

It is certainly well known to have a borrower pledge collateral in order to secure a loan. The most common of such transactions is the real property mortgage where a person, usually to buy a home, secures the loan with a pledge of the real property (typically called a mortgage) in the event that the loan is not repaid according to its terms. Sometimes loans are secured with stocks or other security. In these situations, the property that is securing the loan is liquid, meaning in this context that there is a ready and commonly known market for such security. In addition, such property is easily appraised, either by the lender or by a trusted third party.

When intangible property rights, such as IP rights, are to be the security problems exist in that there is no readily available market for such rights. This is so because IP rights, particularly patent rights, are negative in nature. Conferring only negative rights on their owners. Thus, the owner of a patent can stop others from making, using, selling, and importing products into the country if those product are found to be infringing at least one claim of the patent. Interestingly, a patent does not even give its owner the right to make the product. Because of the nature of the patent rights, backers, and others who typically loan money can not properly evaluate a patent. Even if they could evaluate the patent, since there is no ready market for patent rights, the patent would not be good as security because of its non-liquidity.

The process shown in FIG. 1 remedies this situation by establishing a situation where a non-lender can evaluate a patent, or a patent portfolio and can assign a value thereto. The value may be unique to the evaluator (guarantor) since the guarantor may be able to pre-sell the patent to a prospective buyer or otherwise add value to the patent. Often the guarantor will be able to combine the patent (or patent portfolio) with other patents controlled by the guarantor so that the patent to be pledged has value to the guarantor beyond what it might have to others. In most situations, the value to the third party is far greater than it is to the lender and often even greater than it is to the patent owner.

Process 101 controls the intake of patent data into system 20 (FIG. 2). The identification of the IP rights can be by interactive operation of one or more potential borrowers (not shown) using any communication technique, including network 23. One method for gathering the information then would be the Internet operating in conjunction with one or more applications 24-1 to 24-N working, for example, on an interactive website. This could be accomplished without human intervention on the part of the potential guarantor. Also, process 101 could gather and store, for example in storage 22 (FIG. 2) information (industrial intelligence information) pertaining to products of manufacturers. This industrial intelligence could be information given to the guarantor over a period of time pertaining to IP rights desired to be obtained by a particular company. In this regard, the intelligence information gathering can work in close cooperation with the above-identified system and method such that the guarantor, using for example process 102, can match IP submitted for loan purposes with IP desired by third parties.

Sometimes the submitted IP must be understood in context to how it was developed and how it is to be used. This requires investigation into the IP to determine what the IP pertains to and who the likely infringing or potentially infringing suspects are. Also, the investigation would take into account trends in the marketplace and in manufacturing. All of this information then is processed and a value is placed on the IP rights. This value can be a fixed amount or an amount that diminishes (or increases) with time.

Process 103 then triggers process 104 to determine if the value is sufficient to place a guarantee. For example, assume the value that the guarantor is willing to commit is less than the value need to secure the loan desired by the borrower. In such a situation there would be no point served in making a guarantee and process 105 so informs the potential borrower.

While it is possible for the IP rights to be the only collateral involved in a loan, it is contemplated that the IP rights would be only a portion of the collateral. For example, if a borrow required twenty-five million for a five year period, but the bank could only loan twenty million based on the traditional collateral of the borrower, the IP rights could be used to secure the remaining five million. Using this example, assume the guarantor, after processes 101 and 102, determined that if the guarantor had ownership (or other rights) to the borrower's IP, the guarantor could liquidate those rights, perhaps along with other IP rights owned or controlled by the guarantor, for a value in excess of five million dollars. However, the guarantor also knows that time is critical and after a period of time, say one year, the rights might be worth less than five million dollars. In this scenario, the guarantor concludes that a guarantee can be fashioned such that if default occurs under the note within twelve months the guarantor will pay the lender five million dollars provided the guarantor obtains full title, or whatever rights the guarantor had agreed upon. If default occurs between 12 months and 24 months the value to be paid is three million dollars, etc. These are all terms made part of the guarantee.

Process 106 controls the terms and conditions of any guarantee, as well as terms for default and transfer of rights to the guarantor. This can be interactive and conducted via the Internet if desired and will certainly include the lender, the company and any other interested party.

If desired, the guarantor may use a reinsurance company or other third party back-up, process 107, to help pay any guarantee that comes due. Process 108 submits the guarantee to the lender and in process 109 the guarantor (optionally) receives a fee for the guarantee and perhaps for the initial study of the IP rights. The IP rights study fee can be collected, if desired, even if the IP is not sufficient to warrant a loan guarantee and even if the loan does not close.

During the process of reviewing the IP (process 102) it might be determined that the IP rights, if licensed to a third party immediately, could generated income. This income, could, if desired, be collected by the guarantor under process 110, and used, if desired, to pay down the loan, process 111. The borrow may or may not know the identity of the ultimate licensee since this would all be controlled and negotiated by the guarantor.

As discussed above, FIG. 2 shows one embodiment 20 of a system for controlling the process of FIG. 1. Computer 21, operating alone or in conjunction with other computers, can process the information required for the loan guarantee discussed herein and many users (not shown) working in cooperation with the guarantor can work together coordinated by applications running on system 20

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of supporting a financial transaction involving an owner of intellectual property rights, said method comprising:

evaluating, by a potential guarantor, said IP rights of said owner to determine a guarantee value of said IP rights; and providing, by said guarantor, a pledge to pay to a named party said determined guarantee value in exchange for said guarantor receiving certain negotiated rights in said IP rights in the event of a default of said financial transaction; and wherein said evaluating comprises:

matching said IP rights against a database of known IP needs of third parties other than said named party.

2. The method of claim 1 wherein said certain negotiated rights are ownership rights.

3. The method of claim 1 further comprising:

paying said guarantor a fee for said pledge.

4. The method of claim 1 wherein the financial transaction is a loan.

5. The method of claim 1 wherein said evaluating comprises:
matching said IP rights against an established database of other IP rights controlled by said guarantor.

6. The method of claim 1 further comprising:
obtaining for the benefit of said owner payments due to said owner by a party other than said guarantor, said payments due prior to any said default and wherein said payments are based on licenses obtained by said guarantor under said intellectual property rights.

7. A method for an owner of IP rights to obtain financing using said IP rights; said method comprising:
applying to a loan source for a loan using collateral other than said IP rights;
submitting said IP rights to a party other than said loan source for the purpose of obtaining a guarantee of the portion of said loan not covered by said non-IP collateral; and
agreeing with said guarantee party to transfer to said guarantee party ownership of said IP rights in the event of a default on said loan to said loan source, provided said guarantee party pay said loan source said guaranteed portion of said loan;
said guarantee party negotiating with at least one party other than a party to said loan to have said other party pay royalties for a license to said intellectual property rights; and
collecting payments from licensed other parties prior to any said default occurring.

8. The method of claim 7 further comprising:
providing said guarantee party certain rights in said IP upon said loan being made.

9. The method of claim 7 wherein any said collected payment is paid to said loan source by said guarantee party.

10. The method of claim 9 wherein a portion of any said collected payment is paid to said IP rights owner.

11. The method of claim 7 wherein the amount of said guarantee portion diminishes over time.

12. A system for establishing a guarantee value for a patent portfolio, said system comprising:
means controlled by a potential guarantor for accepting from a person having control of patent rights at least one patent right to evaluate;
means for reviewing any said accepted patent rights to determine the value potential to said guarantor of said accepted patent rights, said value potential taking into account known patent needs of others;
means for establishing a guarantee value for any said accepted patent rights based on said determined value;
means for providing a guarantee to a third party that said potential guarantor will pay said established guarantee value to said third party upon the occurrence of a certain condition; and
means for obtaining from a licensee of said patent rights a value to be paid to said third party while said guarantee is in force.

13. The system of claim 12 wherein said certain condition comprises:
a default on a loan to said third party; and
a transfer of ownership of said accepted patent rights to said guarantor upon said default.

14. The system of claim 12 wherein said guarantee value changes over time.

15. The system of claim 12 further comprising:
obtaining from a third party an agreement to pay at least a portion of said guarantee value should said certain condition occur.

16. The system of claim 12 wherein said reviewing means comprises:
means for comparing said accepted patents against other rights controlled by said potential guarantor.

* * * * *